United States Patent [19]

Watanabe

[11] Patent Number: 4,665,679
[45] Date of Patent: May 19, 1987

[54] APPARATUS FOR BINDING ELONGATE PRODUCTS

[75] Inventor: Kozo Watanabe, Kurobe, Japan

[73] Assignee: Yoshida Kogyo K. K., Tokyo, Japan

[21] Appl. No.: 639,483

[22] Filed: Aug. 10, 1984

[30] Foreign Application Priority Data

Aug. 11, 1983 [JP] Japan ............... 58-147243
Aug. 11, 1983 [JP] Japan ............... 58-147244

[51] Int. Cl.⁴ .................. B65B 13/32; B65B 27/10
[52] U.S. Cl. ......................... 53/131; 53/557;
53/586; 100/18; 100/33 PB; 156/85; 156/384;
156/483; 156/497; 156/580.1
[58] Field of Search ............... 156/73.1, 73.4, 580.1,
156/384, 277, 157, 85, 502, 212, 483, 468, 497,
475, 73.3, 360, 385, 515, 86; 100/33 PB, 18;
53/399, 442, 444, 450, 148, 582, 586, 557, 501,
502, 553, 131

[56] References Cited

U.S. PATENT DOCUMENTS

| | | | |
|---|---|---|---|
| 2,767,535 | 10/1956 | Bentley | 53/586 |
| 3,466,847 | 9/1969 | Farkas | 53/586 |
| 3,552,091 | 1/1971 | Johnston, III et al. | 53/586 |
| 3,681,176 | 8/1972 | Reifenhauser et al. | 156/73.3 |
| 4,229,925 | 10/1980 | Stirniman | 53/399 |
| 4,250,687 | 2/1981 | Lueneberg et al. | 53/442 |
| 4,265,687 | 5/1981 | Mercer et al. | 100/33 PB |
| 4,426,241 | 1/1984 | Zimmermann et al. | 156/468 |
| 4,509,314 | 4/1985 | Bozza | 53/586 |
| 4,517,790 | 5/1985 | Kreager | 156/73.3 |

Primary Examiner—Michael Wityshyn
Attorney, Agent, or Firm—Hill, Van Santen, Steadman & Simpson

[57] ABSTRACT

Elongate products such as slide fasteners discharged from a finishing station are successively received and stored in at least one tray assembly including a plurality of tray members spaced longitudinally thereof. The products are then transported on endless conveyors to a binding station, during which time the products are embraced by at least one binding strip. The binding strip is welded by a welder-cutter at opposite ends of such embraced portion to provide a band encircling the elongate products and simultaneously the band is severed by the welder-cutter at the welded portion, whereby the elongate products are tied together into a bundle. The tray assembly includes tray members are spaced apart from each other to receive the binding strip between adjacent tray members. Product specifications for each group of the elongate products are automatically printed on the binding strip while the products are received and stored in the tray assembly.

1 Claim, 9 Drawing Figures

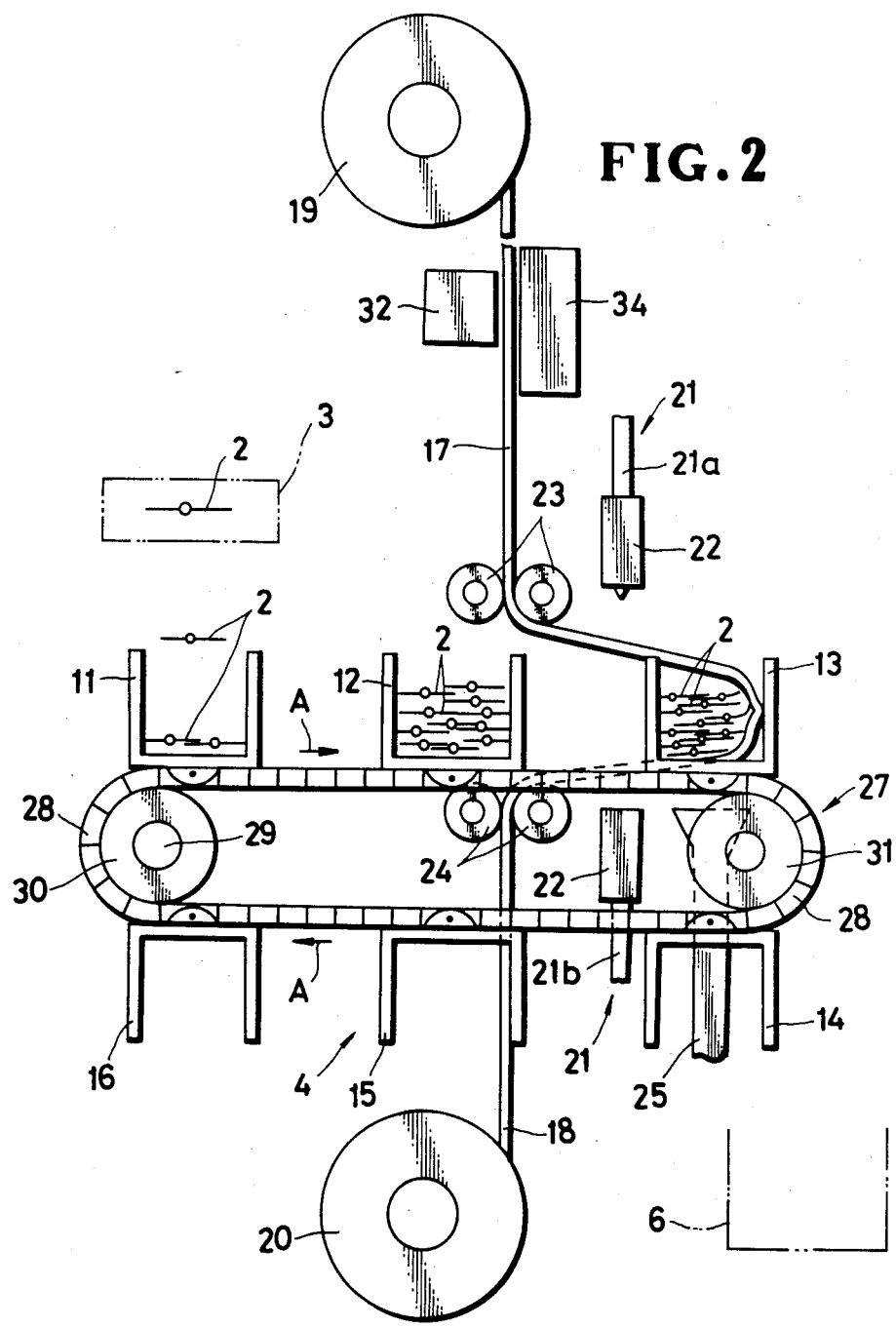

APPARATUS FOR BINDING ELONGATE PRODUCTS

BACKGROUND OF THE INVENTION

1. Field of the Invention

The present invention relates to a method of and an apparatus for automatically binding elongate products such as slide fasteners into bundles.

2. Prior Art

Generally, finished slide fasteners are successively received and stored in trays, then manually bundled up with binding strips and finally packaged for delivery. To this end, considerable manpower and skill have been required particularly for tying individual fasteners together into uniform and firm bundles as desired. Therefore, such manual operation is literally laborious and time-consuming.

The binding strips for slide fasteners have various reference characters or symbols printed thereon to indicate the type, size, color, quantity and other designations for each different group of the slide fasteners. Therefore, the binding strips must be sorted out and allocated for particular fastener groups, for which purpose there are required as many different binding strips as there are specifications for individual slide fastener products. This presents storage problems and invites human error in handling such versatile binding strips.

SUMMARY OF THE INVENTION

It is therefore an object of the present invention to provide a method and apparatus for automatically tying a multiplicity of products such as slide fasteners into uniform and firm bundles at a maximum of efficiency and accuracy.

It is another object of the invention to provide a method and apparatus for automatically printing requisite product specifications on binding media or strips prior to the application thereof onto each selected groups of finished slide fasteners, thereby eliminating the need for preparation and storage of a multitude of different kinds of binding strips.

According to the present invention, individual slide fasteners or products discharged from a finishing station are successively received and stored in a tray assembly consisiting of a plurality of tray members spaced longitudinally of the slide fasteners. The slide fasteners stored in the tray assembly are then transported progessively on endless conveyors to a subsequent binding station where a predetermined number of slide fasteners are taken up and bound together with a binding strip extending transversely around the fasteners piled up in the tray. Product specifications indicating the type, size, color, quantity, etc. of the slide fasteners are printed on the upper binding strip prior to embracing the slide fasteners.

Many other objects, features and additional advantages of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 2 is a cross-sectional view taken along line II—II of FIG. 1;

DETAILED DESCRIPTION OF THE INVENTION

Figure 1:
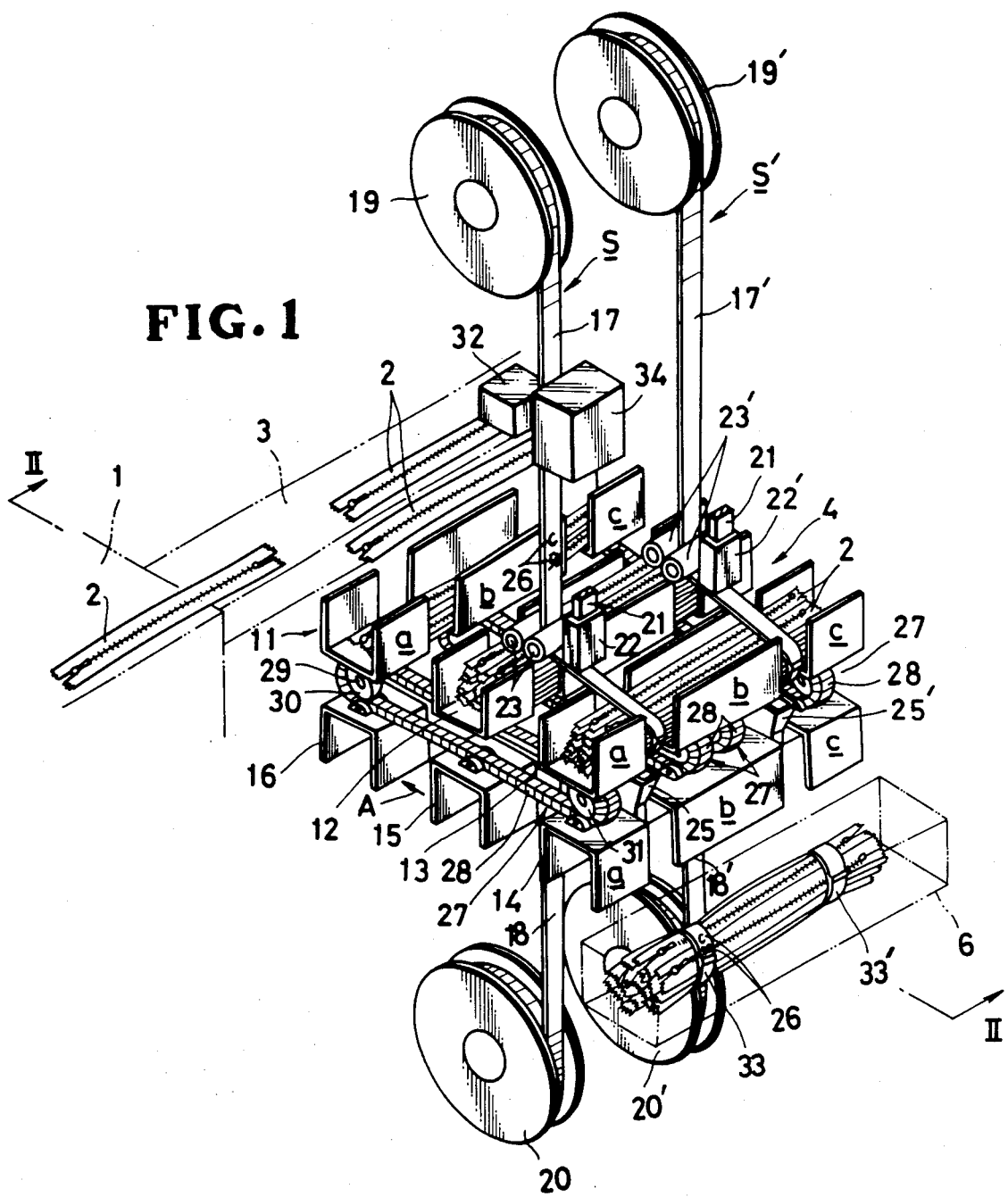
FIG. 1 is a schematic perspective view of a binding apparatus of the invention.

FIG. 1 shows an apparatus 4 for automatically binding elongate products such as slide fasteners 2. The automatic binding apparatus 4 generally comprises six elongate tray assemblies 11, 12, 13, 14, 15, 16 for successively receiving and storing therein a plurality of the slide fasteners 2 discharged from an outlet 3 of a slide fastener finishing apparatus 1, two pairs of upper and lower reels 19, 20, 19', 20' for winding thereon and thereafter supplying two pairs of upper and lower binding strips 17, 18, 17', 18', respectively, and a pair of welder-cutters 21, 21' for welding each pair of the upper and lower strips 17, 18, 17', 18' to form a binding band 33 and for severing the binding band 33 centrally at the welded portion across the thickness thereof.

The binding apparatus 4 further includes a plurality of conveyors 27 each including a caterpillar chain 28 for intermittently moving the tray assemblies 11, 12, 13, 14, 15, 16, a pair of nozzles 25, 25' for ejecting a stream of hot air toward and over the binding bands passed around the slide fasteners 2 in the tray assembly 13, and a printer 34 placed parallel to one upper binding strip 17 for printing on the latter various characters 26 indicative of the type, size, color, quantity, etc. of each group of the slide fasteners 2 to be bound.

Each of the tray assemblies 11, 12, 13, 14, 15, 16, as shown in FIG. 1, is disposed parallel to the slide fasteners 2 as discharged from the outlet 3 and extends transversely of the chain conveyors 27. The tray assemblies 11, 12, 13, 14, 15, 16 are spaced apart at uniform intervals along the length of the endless caterpillar chains 28. Each of the tray assemblies 11, 12, 13, 14, 15, 16 is secured at its bottom on the outer surfaces of the caterpillar chains 28. Each of the tray assemblies 11, 12, 13, 14, 15, 16 includes first, second and third tray members a, b, c of channel-shaped cross section, the tray members a, b, c being spaced from each other transversely of the chain conveyors 27. Each space between the tray members a, b, c is larger than the width of the respective binding strips 17, 18, 17', 18' to allow the latter to directly embrace the slide fasteners 2 in the tray assembly 13.

The endless chain conveyors 27 are spaced from each other longitudinally of the slide fasteners 2. Each endless chain conveyor 27 includes the caterpillar chain 28 and a pair of first and second sprocket wheels 30, 31. Each of the caterpillar chains 28 extends at a right angle to the tray assemblies 11, 12, 13, 14, 15, 16 and is operatively engaged at its one inner end with the first sprocket wheel 30 mounted adjacent to the outlet 3 and at its other inner end with the second sprocket wheel 31 mounted adjacent to a box 6 for receiving the slide fasteners 2 that have been thus bound in and discharged from the tray assembly 13. Each caterpillar chain 28 as engaged at its opposite inner ends with the sprocket wheels 30, 31 provides a pair of upper and lower horizontal taut portions and two arcuate portions around the first and second sprocket wheels 30, 31.

The first sprocket wheels 30 are mounted on a common drive shaft 29 for synchronous rotation, while the sprocket wheels 31 are adapted to rotate idly independently of each other. When the drive shaft 29 is driven to rotate the first sprocket wheels 30, the chains 28 jointly move each tray assembly in the direction of the arrow A (FIGS. 1 and 2) for a predetermined distance that is equal to the interval between adjacent tray assemblies.

The binding strips 17, 18, 17', 18' are made of thermally contractible material such as vinyl chloride or polyethylene for reasons hereafter described. Each pair of the upper and lower binding strips 17, 18, 17', 18' is welded at its opposed leading ends so as to extend continuously between the respective upper and lower reels 19, 20, 19', 20'. One pair of the upper and lower binding strips 17, 18 thus welded (hereinafter referred to as "continuous binding strip S") is disposed between the first and second tray members a, b of the assemblies 12, 15 and vertically extends therethrough in substantial alignment with one side wall of each assembly 12, 15 facing the second sprocket wheels 31. The other pair of the upper and lower binding strips 17', 18' that have been welded (hereinafter referred to as "continuous binding strip S'") is disposed between the second and third tray members b, c of the assemblies 12, 15 and extends therethrough in horizontal alignment with the continuous binding strip S. Each of the upper binding strips 17, 17' is frictionally engaged between respective pairs 23, 23' of upper rollers disposed downwardly from the reels 19, 19', each of the lower binding strips 18, 18' being frictionally engaged between pairs 24, 24' (FIG. 2) of lower rollers disposed upwardly from the reels 20, 20'. The pairs 23, 23' of the upper rollers pull out the upper binding strips 17, 17' from the upper reels 19, 19', respectively and the pairs 24, 24' of the lower rollers pull out the lower binding strips 18, 18' from the lower reels 20, 20', respectively. Each of the continuous binding strips S, S' is held in a suitable position by the pairs 23, 24, 23', 24' of the upper and lower rollers.

Alternatively, the upper and lower binding strips 17, 18, 17', 18' may be made of paper uncoated or coated with synthetic resin, provided that they are easily printable.

As best shown in FIG. 2, each of the welder-cutters 21, 21' (only one is shown) is slightly spaced from the tray assembly 13 toward the tray assembly 12 and includes spaced upper and lower blades 21a, 21b, 21'a, 21'b extending in vertical registry with each other. One welder-cutter 21 is disposed between the first and second tray members a, b, while the other cutter 21' is disposed between the second and third members b, c in horizontal alignment with the welder-cutter 21. The upper blades 21a, 21' a of the welder-cutters 21, 21' are vertically slidably mounted in holders 22, 22' disposed above the tray assembly 13. The lower blades 21b, 21'b of the welder-cutters 21, 21' are vertically slidably mounted in the holders 22, 22' disposed below the tray assembly 13. When actuated, the upper and lower blades 21a, 21b, 21'a, 21'b of each welder-cutter 21, 21' are moved toward each other to press the respective pairs of the upper and lower binding strips 17, 18, 17', 18' facewise against each other at a position diametrically opposite to the opposed leading ends that have been welded. In this embodiment, one of the upper and lower blades of each welder-cutter 21, 21' is an ultrasonic horn and the other is an anvil.

As shown in FIGS. 3A-3D, the nozzles 25, 25' (only one is shown) are disposed under the tray assembly 13 and open upwardly between the first and second tray members 13a, 13b, and between the second and third tray members 13b, 13c, respectively. The two nozzles 25, 25' eject hot air toward and across the binding bands 33, 33' that have encircled the slide fasteners 2 in the tray assembly 13. Thus, the bands, 33, 33' are thermally contracted to hold the fasteners 2 tightly together.

The printer 34 shown in FIG. 1 is disposed over one pair 23 of the upper rollers and its printing head surface confronts a platen 32 with the upper binding strip 17 interposed therebetween. By moving the platen 32 toward the strip 17 until the strip 17 is pressed against the printing head surface of the printer 34, characters 26 indicative of specifications for each group of the slide fasteners 2 are printed on the strip 17. Such specifications include the type, size, color, quantity etc. of the slide fasteners 2. The printer 34 is controlled by a known electronic control circuit (not shown) to timingly perform printing on the upper binding strip 17 while the latter is at rest.

The operation of the binding apparatus 4 will be described with reference to FIGS. 2 and 3A-3E.

FIGS. 3A-3D illustrate the manner in which the slide fasteners 2 in the tray assembly are bound into a bundle with two continuous binding strips S, S' (only one is shown).

Figure 3A:
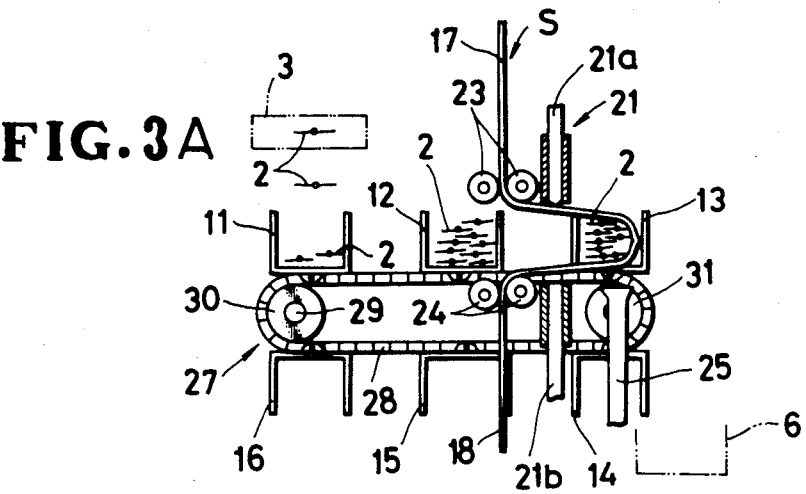
FIGS. 3A–E illustrate the sequence of binding steps according to the invention.
Figure 3B:
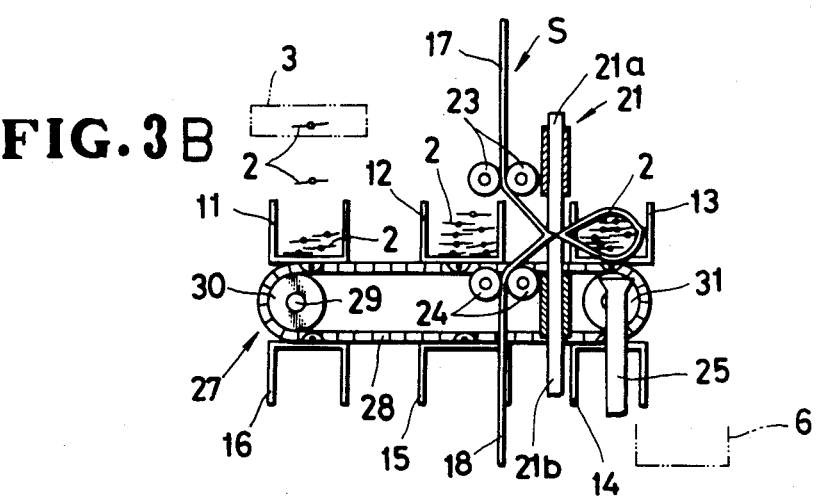
Figure 3C:
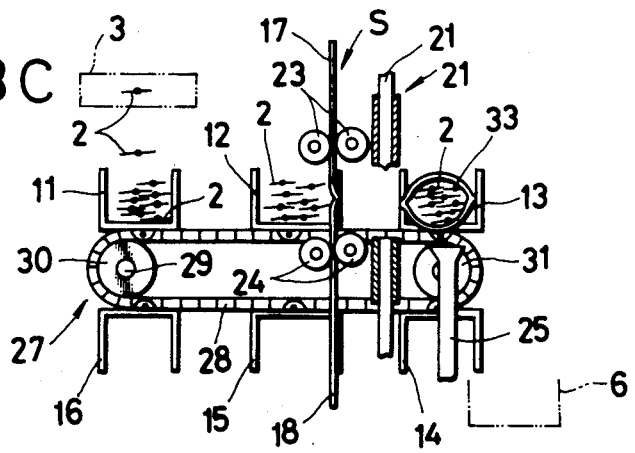
Figure 3D:
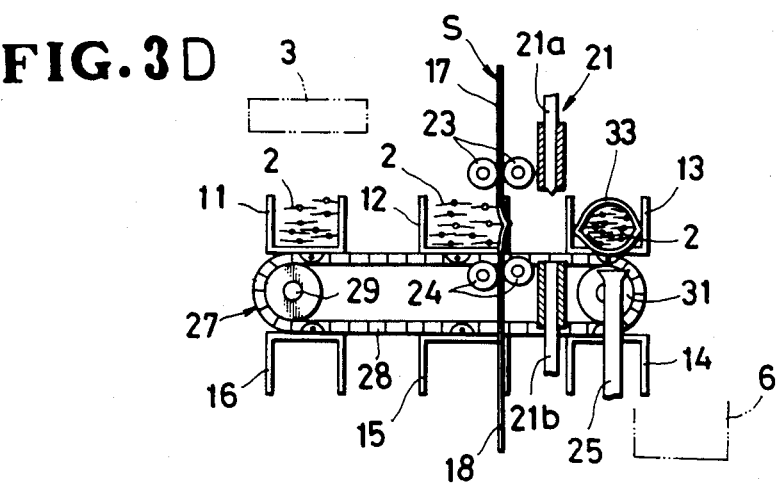
Figure 3E:
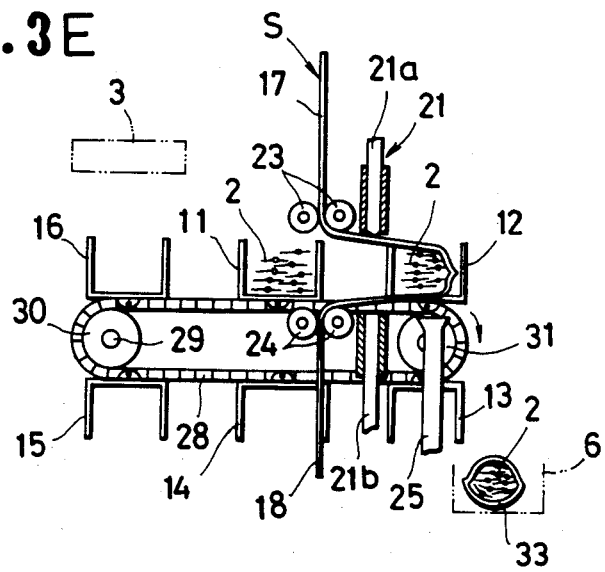

FIG. 3E illustrates each tray assembly 11, 12, 13, 14, 15, 16 that has moved clockwise for a predetermined distance from its position shown in FIGS. 3A-3D.

While the endless chain conveyors 28 are at rest, three tray assemblies are located on the upper horizontal chain portion, and three empty tray members, on the other hand, are located on the lower horizontal chain portion.

In FIGS. 3A-3D, the tray assembly 11 is at a first position where it receives the slide fasteners 2 discharged from the outlet 3 of the finishing apparatus 1. The tray assembly 12 is at a second position where the binding strips S, S' are introduced between the tray members 12a, 12b, 12c and the tray assembly 13 is at a third position where the slide fasteners 2 are bound with the bands 33, 33' of the continuous binding strips S, S'. The slide fasteners 2 are embraced by the continuous binding strips S, S' as they are carried in the tray assembly from the second position to the third position. The tray assemblies 14, 15, 16 are at fourth, fifth and sixth positions, respectively.

Each group of the slide fasteners 2 is embraced by the continuous binding strips S, S' as it is carried in the tray assembly in a direction perpendicular to the strips S, S' to the third position. At this time, the continuous binding strips S, S' are allowed to enter between the first and second tray members a, b, and between the second and third tray members b, c of the assembly, respectively, and then start embracing the slide fasteners 2. Simultaneously, the continuous binding strips S, S' are pulled out or unwound from the upper and lower reels 19, 20, 19', 20' by the pairs 23, 24, 23', 24' of the upper and lower rollers.

FIG. 3A shows the slide fasteners 2 thus embraced in the tray assembly 13. As shown in FIG. 3B, the upper and lower blades 21a, 21b, 21'a, 21'b of each welder-cutter 21, 21' are then actuated to move toward each other to press the upper and lower binding strips 17, 18, 17', 18' facewise against each other at opposite ends of such embraced portion, thereby completely surrounding the slide fasteners 2. Then, each pair of the upper and lower binding strips 17, 18, 17', 18' is welded at the portion that have been pressed to form a binding band 33, 33' and virtually at the same time the binding band 33, 33' is severed by the welder-cutter transversely at such welded portion. Thus, the slide fasteners 2 in the tray assembly 13 have now been bound at two longitudinally spaced positions with two bands 33, 33' of the binding strips S, S'.

When the slide fasteners 2 have thus been tied together into a bundle, the upper and lower blades 21a, 21b, 21'a, 21'b of each welder-cutter 21, 21' are moved away from each other, and the pairs 23, 24, 23', 24' of the upper and lower rollers are slightly rotated reversely so that the respective binding strips S, S' assume a stretched upright posture, as shown in FIG. 3C. The nozzles 25, 25' are then actuated to eject hot air toward and over the binding bands 33, 33' that have encircled the slide fasteners 2 in the tray assembly 13, as shown in FIG. 3D. Consequently, the bands 33, 33' are thermally contracted to hold the slide fasteners 2 tightly together.

While the slide fasteners 2 are taken into bundles in the tray assembly 13, the tray assembly 11 at the first position keeps receiving the slide fasteners 2 discharged from the outlet 3 of the finishing apparatus 1.

When the slide fasteners 2 in the tray assembly 13 have been tightly bound and a desired number of the slide fasteners 2 have been received and stored in the tray assembly 11, the endless conveyors 27 are again driven by the common shaft 29, so that each tray assembly 11, 12, 13, 14, 15, 16 is moved to the next position, as shown in FIG. 3E. The tray assembly 13, for example, moves down to the fourth position, during which time the slide fasteners 2 as tightly bound therein fall into the box 6. The tray assembly 16, on the other hand, moves up to the first position for receiving the slide fasteners 2 discharged from the outlet 3 of the finishing apparatus 1. The tray assembly 12 is moved in a direction perpendicular to the binding strips S, S' to the third position, at which time the binding strips S, S' are pulled out from the reels 19, 20, 19', 20' by the pairs 23, 24, 23', 24' of the rollers. Alternatively, the binding strips S, S' may be pulled out directly by the slide fasteners 2 as the latter are carried ahead in the tray assembly 12.

The printer 34 prints various characters 26 on one surface of the upper binding strip 17 at a portion thereof between the reel 19 and the pair 23 of the upper rollers, the characters to be printed being indicative of information on the slide fasteners 2 to be received and stored in the tray assembly 11 that is at the first position. Thus, the printer 34 prints on the upper binding strip 17 prior to the latter's embracing the slide fasteners 2. Therefore, when each group of the slide fasteners 2 discharged from the outlet 3 has different type, size, color, or quantity etc. from the preceding group, the printer can be easily adjusted to print exact information on the corresponding group of the slide fasteners 2. The printer 34 is controlled by a known electronic circuit to timingly perform printing while the upper binding strip 17 is at rest.

Figure 4:
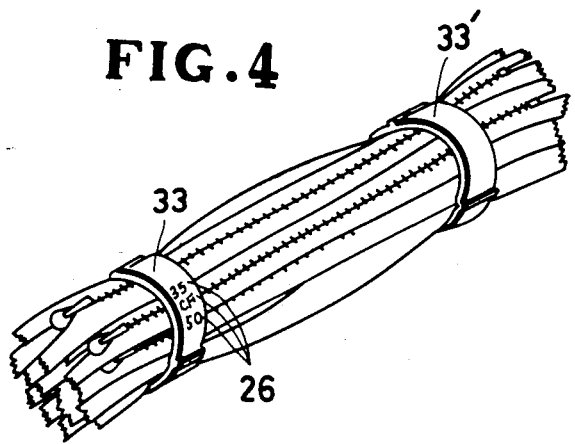
FIG. 4 is a perspective view illustrating an example of elongate products bound by the binding apparatus of the invention.

As shown in FIG. 4, the slide fasteners 2 as discharged in a bundle into the box 6 have been bound at two longitudinally spaced places thereof with two binding bands 33, 33' and various characters 26 have been printed on one band 33 at at least one portion thereof. The characters 26 are indicative of such information as the type, size, color, quantity, etc. of the slide fasteners 2 thus bound with the bands 33, 33'.

Figure 5:
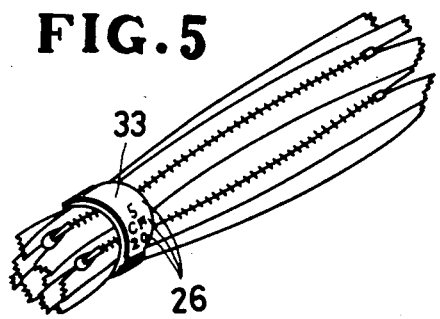
FIG. 5 is a perspective view of another example of the elongate products bound by the binding apparatus of the invention.

FIG. 5 shows, as a modification, the slide fasteners 2 bound at a single place with only one binding band 33. In this case, only one pair of the upper and lower strips 17, 18 is employed, and the other pair of the upper and lower strips 17', 18' is omitted.

In the embodiments described above, the upper and lower binding strips 17, 18, 17', 18' are made of thermally contractable material, but alternatively they may be of thermally non-contractable material. In the latter case the nozzles 25, 25' may be ommitted.

As described above, according to the method and apparatus, each group of the slide fasteners received and stored in the tray assembly is automatically bound with the binding strips, thereby achieving uniform and firm binding relatively easily and less costly.

Moreover, the printer prints various product specifications for each group of the slide fasteners on the upper binding strip prior to the latter's embracing the slide fasteners, that is, when the slide fasteners are received in the tray assembly at the first position. Hence, the printer can be easily adjusted depending on the type, size, color, quantity etc. of each group of the slide fasteners to be bound, thereby eliminating the need for preparing many different binding strips.

Although various minor modifications may be suggested by those versed in the art, it should be understood that I wish to embody within the scope of the patent warranted hereon, all such embodiments as reasonably and properly come within the scope of my contribution to the art.

What is claimed is:

1. An apparatus for automatically binding elongate products discharged from a finishing station, said apparatus comprising:
   (a) at least one tray assembly including a plurality of tray members disposed parallel to the elongate products and spaced longitudinally thereof for receiving and storing the elongate products at a first position;
   (b) at least one conveyor including an endless belt and a pair of first and second sprocket wheels, said endless belt being engaged at its opposite inner ends with the pair of said first and second sprocket wheels and extending transversely of said tray assembly, said tray assembly being secured on said endless belt for transporting the products from the first position via a second position to a third position;
   (c) at least one continuous, thermally contractable binding strip disposed in the second position and extending vertically through a path of travel of said tray assembly in registry with a space between said tray members;
   (d) at least one welder-cutter disposed in the third position and including a pair of spaced upper and lower blades extending in vertical registry with each other, said upper and lower blades being vertically movable toward and away from each other for welding said binding strip to provide a binding band for encircling the elongate products in said tray assembly;
   (e) a printer disposed adjacent to said binding strip for printing product specifications for each group of the elongate products while the products are received and stored in said tray assembly at the first position; and
   (f) at least one nozzle disposed in the third position and opening upwardly for ejecting hot air toward and across the thermally-contractable binding band remotely from the printed specifications to hold the elongate products tightly together.

* * * * *